Nov. 19, 1957     T. K. WOODWORTH     2,813,556
CHAIN SAW WITH SPIKED REACTION ATTACHMENT
Filed Sept. 29, 1953     2 Sheets—Sheet 1
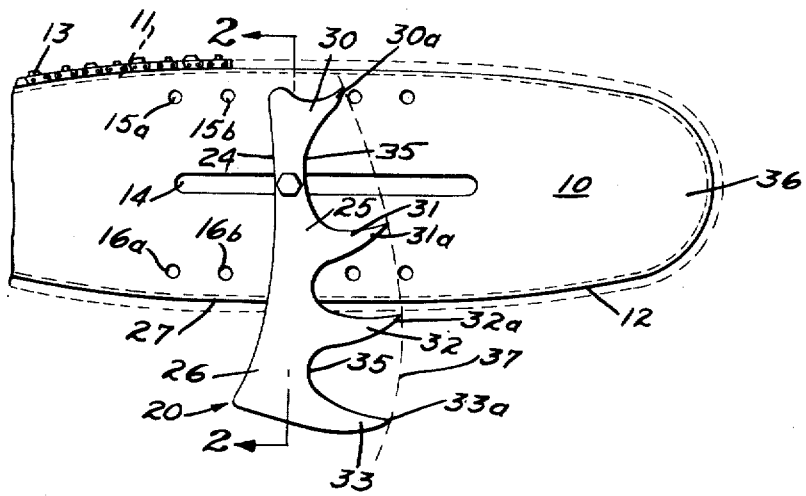
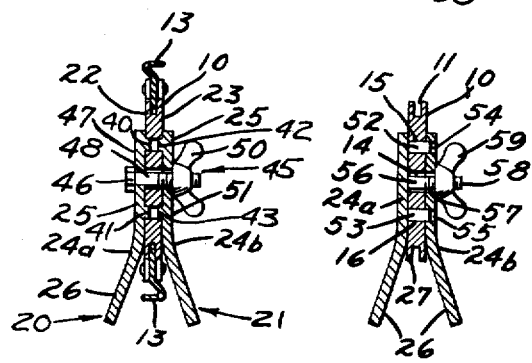
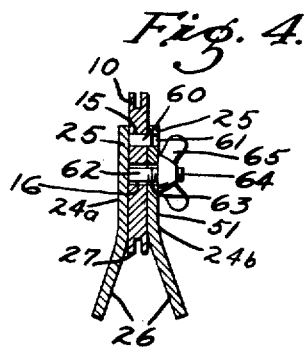
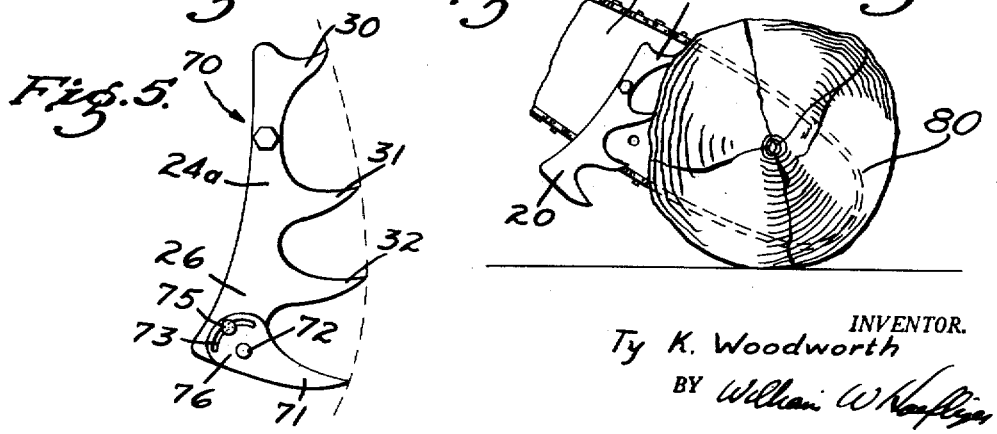
INVENTOR.
Ty K. Woodworth
BY William W. Kaeppler
Agent

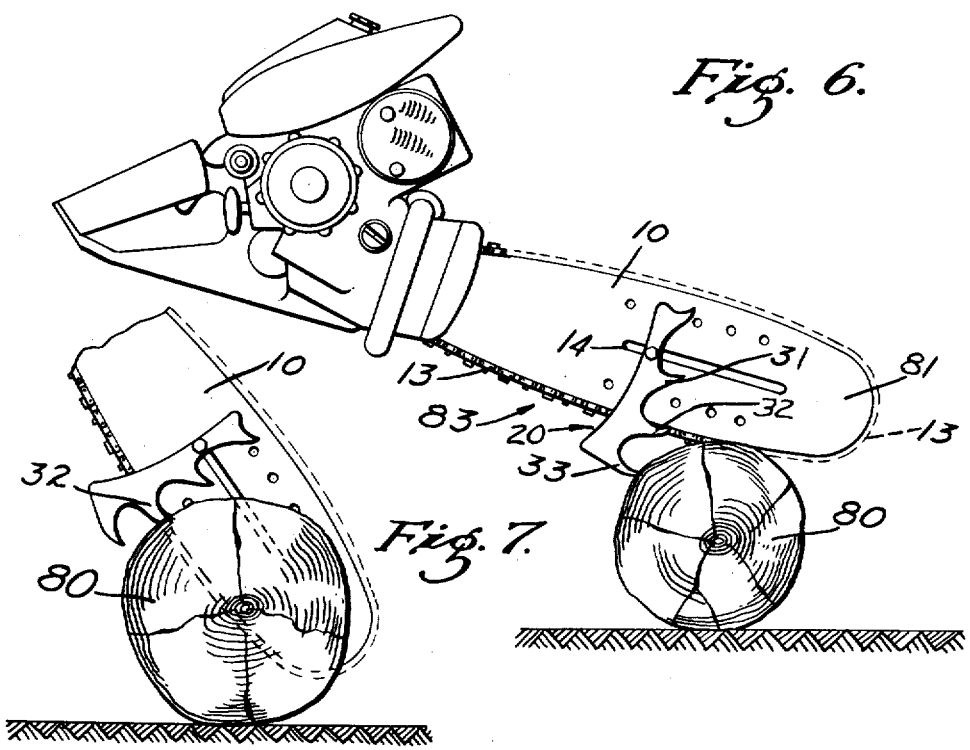
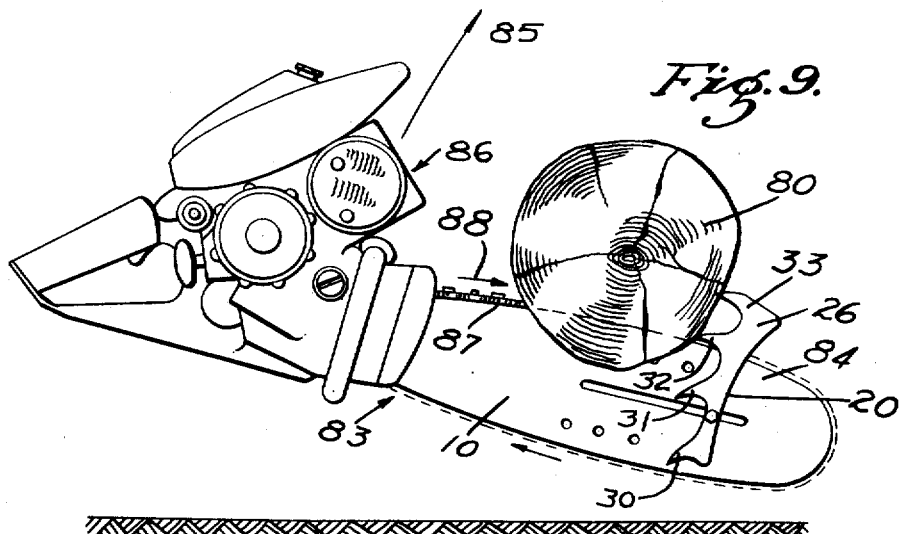

United States Patent Office 2,813,556
Patented Nov. 19, 1957

2,813,556

CHAIN SAW WITH SPIKED REACTION ATTACHMENT

Ty K. Woodworth, Pomona, Calif., assignor to McCulloch Motors Corporation, Los Angeles, Calif., a corporation of Wisconsin Application September 29, 1953, Serial No. 382,928

1 Claim. (Cl. 143—32)

This invention relates to chain saws for cutting logs and limbs of various sizes, and more particularly to a chain saw which enables the convenient use of a single size bar in cutting or bucking logs or limbs of various sizes.

It is an object of the invention to provide a chain saw having a chain guiding bar and wood engaging reaction member, the bar and reaction member being combined together in such a way that only the end portion of the bar may be allowed to pass through a log or limb during a bucking operation, thereby enabling the bar to be inclined conveniently upwardly by the operator during cutting without causing the end portion of the bar and the chain carried thereby to engage the ground.

It is another object of the invention to provide an efficient spiked reaction member for a chain saw bar, adjustably secured together in such a way that the reaction member may be moved into various positions along the length of the saw bar and rigidly clamped thereto, thereby providing a means for adjusting the effective cutting length of the saw bar.

It is another object of the invention to provide a novel spiked reaction member for adjustable attachment to a chain saw bar, the reaction member being constructed in such a way that it may be moved along the bar and clamped into various positions thereon without necessitating its entire removal from the saw bar.

It is a further object of the invention to provide a novel spiked reaction member for adjustable attachment to a chain guiding saw bar, the reaction member and bar incorporating a means for reversing the position of the reaction member with respect to the bar so that the reaction member projects upwardly beyond the upper edge of the saw bar, thereby enabling the operator to use the chain carrying portion of the upper edge of the bar lying between the reaction member and the chain saw engine for wood cutting.

Further objects and advantages of the invention will be brought out in the following part of the specification wherein, for the purpose of completeness of disclosure, a preferred embodiment has been described in close detail, without limiting the scope of the invention set forth in the appended claim. Referring to the drawings which are for illustrative purposes only:

Fig. 1 is an elevational view of the saw bar with the spiked reaction member attached thereto;

Fig. 2 is a cross-sectional view taken on line 2—2 of Fig. 1 and illustrating the means for connecting the reaction member to the saw bar;

Fig. 3 is a cross-sectional view of a modified form of the connecting means shown in Fig. 2;

Fig. 4 is a cross-sectional view of another form of connecting means for joining the reaction member to the saw bar;

Fig. 5 is an elevational view of a modified form of the spiked reaction member;

Fig. 6 is an elevational view illustrating the use of the invention at the beginning of a cutting operation;

Fig. 7 is an elevational view of the cutter bar and the reaction member illustrating the relationship of these members and the inclination thereof during a log cutting operation;

Fig. 8 is a view similar to Fig. 7 showing the relationship of the bar and reaction member to the log and ground near the end of a cutting operation; and Fig. 9 is an elevational view of the chain saw and cutting bar showing the use of the spiked reaction member in reversed position.

Referring now to the drawings, the numeral 10 in Fig. 1 designates a thin elongated chain saw bar having a slot or groove 11 extending around the periphery 12 thereof for guiding a cutting chain 13. The mid-portion of the saw bar 10 has an elongated slot 14 formed therein communicating between opposite sides or faces of the bar and extending in the longitudinal direction of the bar. A series of holes 15a, 15b, etc. may be drilled or formed in the saw bar on one side of slot 14 and spaced therefrom. A second series of holes 16a, 16b, etc. may be formed in the saw bar on the opposite side of the slot 14 and spaced therefrom. A series of holes 15 and 16 extends generally in the longitudinal direction of the saw bar with opposite complementary holes 15a and 16a, and 15b and 16b, etc. being spaced apart in such a way that a line through holes 15a and 16a lies generally parallel to a line through the pair of holes 15b and 16b, both lines lying generally normal to the longitudinal axis of the saw bar. The same relation holds true for the remaining holes in the series 15 and 16.

A pair of complementary spike carrying units 20 and 21 are affixed to opposite sides 22 and 23 of the saw bar, as shown in Figs. 1 and 2. Each unit 20 and 21 includes an elongated part or plate such as the leg member 24, extending generally normal to the longitudinal axis of the saw bar 10 and having a first portion 25 extending adjacent the saw bar 10 and a second portion 26 extending beyond the edge 27 of the saw bar and curved laterally outwardly from the plane of the saw bar. Each of the spike carrying units 20 and 21 carries a plurality of spikes such as individual spikes 30, 31, 32 and 33, which may extend outwardly past the side or edge 35 of each leg member 24 and in a direction toward the forward or outboard end 36 of the saw bar 10.

The tip of each of the spikes 30, 31, 32 and 33 is curved slightly upwardly, as shown in Fig. 1 in order that the spike may be caused to "hook" or "bite" under the bark of the log being cut by the chain 13 of the saw bar 10. The tips 30, 31a, 32a, and 33a of the spikes define points lying on a smooth curve which is shown by a dotted line 37 which extends upwardly and rearwardly from the lower edge 27 of the bar 10. The convex side of curve 37 faces the forward end 36 of the saw bar for the reason that spike tips 33a, 32a, 31a, and 30a may then be brought successively into engagement with the log being cut with a minimum upward rotation or inclination of the saw bar 10 by the operator during cutting.

The two-leg members 24a and 24b are supported in straddling engagement with opposite sides 22 and 23 of the saw bar 10 by connecting means which may include a lug or lugs and a retaining member. The connecting means illustrated in Fig. 2 includes spaced lugs 40 and 41 formed in leg member 24a and adapted to engage or project part way into any pair of complementary holes in the series 15 and 16. Leg member 24b also has a pair of spaced lugs 42 and 43 formed therein which are adapted to engage or project into the opposite ends of the holes engaged by lugs 40 and 41. The connecting means also includes a retaining member 45 adapted to engage opposite or complementary leg members 24a and 24b in such a way that the two leg members may be releasably clamped or locked into engagement with opposite sides 22 and 23 of the saw bar 10. The retaining member 45 may be a bolt having a head 46 engaging the outer side 47 of leg member 24a, and having a shank 48 projecting through an aperture in the leg member 24a, through the slot 14, and through an aperture in leg member 24b. The end 49 of the shank is threaded so that it may be engaged by a threaded member such as wing nut 50, which, when tightened on the bolt shank 48, engages the outer face 51 of leg member 24b and causes the leg members 24a and 24b to be held in engagement with opposite sides or faces 22 and 23 of the saw bar 10. Lugs 40, 41, 42 and 43 are locked into engagement with the holes 15 and 16, thereby preventing displacement of the leg members 24a and 24b with respect to the saw bar 10, parallel to the plane thereof.

It is to be noted that the length of the lugs 41, 42, 43 and 44, as defined by the amount by which they project outwardly from the leg members 24a and 24b, need only be sufficient to ensure positive locking of the leg members into engagement with bar 10. In fact it is desirable to keep the length of each lug as small as possible in order to permit easy disengagement of the lugs from a pair of complementary holes, such as 15a and 16a, when the wing nut 50 is loosened on the threaded shank 48, so that the leg members may be shifted longitudinally along the saw bar to a different position thereon, without completely disengaging the wing nut 50 from shank 48. The spike carrying units 20 and 21 may, of course, be shifted along the saw bar 10, between the end limits of the slot 14, into any desired position of engagement with any complementary pair of holes 15 and 16.

Modified forms of connecting means for clamping the spike carrying units 20 and 21 into engagement with the bar 10 are shown in Figs. 3 and 4. In Fig. 3 the leg member 24a has a pair of spaced lugs 52 and 53 formed thereon which are adapted to project through the complementary apertures 15 and 16 in bar 10 and into apertures 54 and 55 in leg member 24b, forming a loose fit therewith. In this way the leg members 24a and 24b are complementarily aligned, oppositely, on opposite sides of the bar 10. The connecting means also includes a shank 56 which is formed integrally with leg member 24a, as by welding it thereto. Shank projects laterally through the slot 14 in the bar 10 and through an aperture 57 in leg member 24b, the end portion 58 of the shank 56 being threaded. An internally threaded member such as nut 59 engages the threaded end portion 58 of the shank 56 and may be tightened to lock the leg members 24a and 24b into rigid engagement with the saw bar 10.

In Fig. 4 there is illustrated another form of connecting means which includes a lug 60 formed on leg member 24a and adapted to project laterally through aperture 15 in the saw bar and into aperture 61 in leg member 24b, forming a loose fit therewith. A shank member 62 formed integrally with leg member 24a and spaced from lug 60 projects laterally through hole 16 in bar 10 and through aperture 63 in leg member 24b. The end portion 64 of shank 62 is threaded to engage an internally threaded member such as nut 65 which may be tightened thereon to engage the outer face 51 of leg member 24a and to lock the leg members 24a and 24b into rigid engagement with the saw bar 10. It will be noted that the slot 14 in the bar is entirely eliminated by this construction of the connecting means. The leg members 24a and 24b may, of course, be attached to opposite sides of the bar 10 in the several positions defined longitudinally thereof by complementary pairs of holes 15a and 16a, and 15b and 16b, etc. Other similar types of connecting means may be provided to clamp the leg members into straddling engagement with the saw bar.

The spike carrying unit 70 illustrated in Fig. 5 is similar to the spike carrying unit 20 in all respects except for the construction of lower spike 71. The latter is pivotally mounted on the laterally curved lower portion 26 of leg member 24a by means of a pin 72. The spike 71 may include a slotted portion 73 through which there projects a bolt 74, the threaded end of which engages a threaded aperture in portion 26 of the leg member 24a. The head 75 of the bolt is adapted to be tightened into frictional engagement with the surface of body portion 76 of spike 71 to retain the spike in a desired angular relation with respect to the leg member 24a. The bolt may, of course, be loosened to permit the spike to pivot into a new angular disposition, which pivoting is facilitated by the slot 73. It will be understood that the disposition of the slot and bolt may be altered so that the slot is formed in the lower portion 26 of leg member 24a and the bolt engages the body portion 76 of the spike. The foregoing construction enables the chain saw operator to achieve the most efficient gripping of the log by spike 71 at the beginning of a cut by adjusting the angular disposition of the log engaging spike 71.

Figs. 6, 7 and 8 illustrate the engagement of the spiked units 20 and 21 with a log 80. At the beginning of a "bucking" cut as shown in Fig. 6, the lower spike 33 is engaged with the log 80, permitting the forward end 81 of the saw bar to be pivoted downwardly, bringing the cutting chain 13 into engagement with the log. As the cut progresses, the operator may pivot the forward end 81 of the bar into the cut, about the point of spike 33, thereby bringing spike 32 into engagement with the log and freeing spike 33, as shown in Fig. 7. The spiked units may be completely disengaged from the log from time to time by pulling the chain saw 83 rearwardly with respect to the log, in order that the saw bar may drop further into the kerf already cut by the chain, which, of course, changes the disposition of the spikes with respect to the log. In Fig. 8 there is illustrated the disposition of the saw bar 10, the spiked units 20 and 21, and the log 80 near the end of a cut through the log 80. It will be noted that the upper spike 30 has come into engagement with the log 80, and that the final portion of the cut may be accomplished by pivoting the saw bar 10 clockwise about the point of engagement of spike 30 with log 80.

The spiked units 20 and 21 may be attached to the bar in reversed position as shown in Fig. 9 so as to cause the laterally outwardly curved portion 26 of the spiked units to project upwardly beyond the upper edge 84 of the saw bar 10. It will be noted that the spikes 30, 31, 32 and 33 extend rearwardly in the position shown, facilitating the use of the saw bar 10 and spiked reaction members 20 and 21 in an undercutting operation on log 80. Spike 33 is shown engaged with the log. As the cut progresses, the saw bar 10 may be pivoted upwardly or clockwise into the kerf about the point of contact of the spike 33 with log 80, in the direction of arrow 85. The spiked units 20 and 21 also serve as reaction members during the undercutting operation, with the portion of the chain between the reaction members 20 and 21 and the chain saw engine 86 travelling along the top edge 87 of the bar and in the direction of arrow 88 doing the undercutting and giving rise to the reaction forces tending to force the chain saw 83 rearwardly from the log and toward the operator.

The spiked attachment for the saw bar has special utility in that it allows the operator to cut up small limbs lying on the ground without stooping, since the "reach" of the operator and chain saw combination is lengthened by an amount equal to the distance between the inboard end of the saw bar and the actual position of the spiked attachment on the bar. In other words, reactive loads are taken at a point far out on the bar instead of at the inboard end thereof, as by the conventional arrangement. Furthermore, the position of the spiked units may be conveniently adjusted by the operator to vary the length of the cutting end of the bar in order to accommodate various sized logs in cutting operations.

Another special utility arising from the provision of the spiked units lies in the dual engagement of the spiked units with the log being cut, lending a high degree of lateral stability to the support of the saw bar and chain saw during cutting. In other words, two spaced points of support are provided by the two leg members 24a and 24b, one on each side of the saw bar 10 and equidistant therefrom. Furthermore, the chain 13 may be removed from the saw bar and a new chain attached in place thereof without necessitating removal of the spiked attachment from the bar.

I claim:

An attachment for use on a chain saw bar having therein a longitudinal slot and recesses spaced along said slot including: a pair of spike carrying members disposed on opposite sides of said bar, said members each having a log-engaging spike portion disposed below the lower edge of said bar and in laterally spaced relation to, and upon opposite sides of, the plane defined by said bar, for simultaneous engagement with points on the log being cut laterally spaced from the plane defined by said bar; connecting means for said members comprising a clamping element adapted to pass through said longitudinal slot in the chain saw bar and secure said members on opposite sides of said chain saw bar; and means extending from said members into said recesses to prevent rotation of said members around said clamping element, said clamping element comprising a screw member extending through said slot from one of said spike carrying members to the other and passing through at least one of said spike carrying members, and a clamping nut on said screw member which, when retracted, permits a separation of said spike carrying members sufficient to disengage said means from said recesses whereby said screw member may be slid along said slot to bring said spike carrying members to a new position on said bar.

References Cited in the file of this patent

UNITED STATES PATENTS

| | | |
|---|---|---|
| 2,525,110 | Adair | Oct. 10, 1950 |
| 2,567,886 | Mall et al. | Sept. 11, 1951 |
| 2,572,405 | Stone et al. | Oct. 23, 1951 |
| 2,642,901 | Hayden | June 23, 1953 |
| 2,665,719 | Pennanen | Jan. 12, 1954 |
| 2,698,034 | Jakku | Dec. 28, 1954 |

OTHER REFERENCES

Mall Brochure, Models 10, 12, 3E. etc. page 1 (Front page.) Received in Div. 29; Feb. 28, 1950.

UNITED STATES PATENT OFFICE
CERTIFICATE OF CORRECTION

Patent No. 2,813,556 November 19, 1957

Ty K. Woodworth

It is hereby certified that error appears in the printed specification of the above numbered patent requiring correction and that the said Letters Patent should read as corrected below.

Column 2, line 22, for "A series" read --Each series--.

Signed and sealed this 11th day of February 1958.

(SEAL)
Attest:
KARL H. AXLINE

Attesting Officer

ROBERT C. WATSON
Commissioner of Patents